United States Patent
Saeki et al.

(10) Patent No.: US 7,840,727 B2
(45) Date of Patent: Nov. 23, 2010

(54) SERIAL-TO-PARALLEL CONVERSION/PARALLEL-TO-SERIAL CONVERSION/ FIFO UNIFIED CIRCUIT

(75) Inventors: Takanori Saeki, Kanagawa (JP); Yasushi Aoki, Kanagawa (JP); Masatomo Eimitsu, Kanagawa (JP); Masashi Nakagawa, Kanagawa (JP); Minoru Nishizawa, Kanagawa (JP); Tadashi Iwasaki, Kanagawa (JP); Koichiro Kiguchi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 98 days.

(21) Appl. No.: 11/491,919

(22) Filed: Jul. 25, 2006

(65) Prior Publication Data

US 2007/0073943 A1    Mar. 29, 2007

(30) Foreign Application Priority Data

Jul. 28, 2005    (JP)    ............................... 2005-219344

(51) Int. Cl.
*G06F 13/12* (2006.01)
*G06F 9/44* (2006.01)

(52) U.S. Cl. ........................................ 710/71; 717/128
(58) Field of Classification Search .................... 710/71
See application file for complete search history.

(56) References Cited

U.S. PATENT DOCUMENTS

| 4,620,180 A | * | 10/1986 | Carlton ........................ 341/100 |
| 4,674,064 A | * | 6/1987 | Vaughn ......................... 710/71 |
| 5,134,702 A | * | 7/1992 | Charych et al. ............... 710/71 |
| 5,398,241 A | * | 3/1995 | Witchey ...................... 370/391 |
| 6,198,415 B1 | * | 3/2001 | Yoshikawa et al. .......... 341/100 |
| 6,266,799 B1 | * | 7/2001 | Lee et al. ........................ 716/6 |
| 6,693,986 B2 | | 2/2004 | Nemoto |
| 6,753,712 B2 | | 6/2004 | Saeki |
| 7,336,754 B2 | | 2/2008 | Aoyama |
| 2002/0079938 A1 | | 6/2002 | Saeki |
| 2005/0135527 A1 | | 6/2005 | Masui et al. |

FOREIGN PATENT DOCUMENTS

| JP | 62-233931 A | 10/1987 |
| JP | 2-89424 A | 3/1990 |
| JP | 4-286422 A | 10/1992 |
| JP | 9-135237 A | 5/1997 |
| JP | 2000-151568 A | 5/2000 |
| JP | 2002-190724 A | 7/2002 |
| JP | 2003-333021 A | 11/2003 |
| JP | 2003-347941 A | 12/2003 |
| JP | 2005-5999 A | 1/2005 |
| JP | 2005-033681 A | 2/2005 |
| JP | 2001-244917 A | 7/2005 |
| JP | 2005-192192 A | 7/2005 |

* cited by examiner

*Primary Examiner*—Henry W Tsai
*Assistant Examiner*—Titus Wong
(74) *Attorney, Agent, or Firm*—Foley & Lardner LLP

(57) ABSTRACT

Disclosed is a serial-to-parallel converter/parallel-to-serial converter/FIFO unified circuit which includes a register, a selector and a counter. The register receives serial input data and converts the serial data into parallel data based on frequency-divided multi-phase clock signals from a counter. The selector receives the parallel data from the register to select one of the data in accordance with a control signal. The counter generates the control signal for the selector so that plural items of data will be output serially from the selector in the sequence in which the plural items data have been serially supplied to the register.

12 Claims, 7 Drawing Sheets

SERIAL-TO-PARALLEL CONVERSION/PARALLEL-TO-SERIAL CONVERSION/ FIFO UNIFIED CIRCUIT

FIELD OF THE INVENTION

This invention relates to a circuit composed of a serial-to-parallel converter/FIFO (First In First Out)/parallel-to-serial converter and which may be conveniently applied to e.g. an interface circuit.

BACKGROUND OF THE INVENTION

FIG. 6 illustrates the typical configuration of a conventional serial digital interface, also termed serialization/deserialization (SerDes), adapted for transferring data at a rate of giga-bit band. Referring to FIG. 6, in this serial digital interface, an input buffer 101 is differentially supplied with complementary received signals RXT and RXC to output a differential signal. A PLL (phase-locked loop) circuit 102 outputs a clock signal which is phase-synchronized with a system clock signal SCLK and its complementary signal SCLKB. The differential output clock signal of the PLL circuit 102 is supplied to a divider 103. This divider 103 outputs divided multi-phase clocks with respective phases thereof equally spaced each other. The multi-phase clocks from the divider 103 are supplied to a phase interpolator (phase-shift circuit) 102.

The phase interpolator 104 outputs multi-phase clocks, each phase of which corresponds to the phase obtained by internal division of the phase difference between the associated input clock signals. The multi-phase clocks output from the phase interpolator 104 are supplied to a sample circuit 105.

The sample circuit 105 includes a plurality of flip-flops, not shown, connected in parallel. The flip-flops, which receive the output signal (received data) of the input buffer 101 at data terminals thereof, and receives, as sampling clocks, corresponding ones of multi-phase clocks from the phase interpolator 104 at clock terminals thereof, latch and output the received data responsive to the respective sampling clocks.

A CDR (clock and data recovery) control circuit 106 includes an up/down counter receiving an output of a flip-flop, not shown, of the sample circuit 105, and counting up and down when an output of the flip-flop is logic 0 or logic 1, respectively. The CDR control circuit also includes a filter, not shown, for time averaging an output of the up/down counter, and a control circuit, not shown, receiving and decoding an output of the filter and transmitting a phase controlling signal (ratio of internal division of the phase interpolator 104) to the phase interpolator 104. The divider 103, phase interpolator 104, sample circuit 105 and the CDR control circuit 106 compose a clock and data recovery circuit. The clock and data recovery circuit generates and outputs received data and a recovered clock signal. Regarding the detail of the clock and data recovery circuit, reference may be made to e.g. Patent Document 1.

Out of a plural number (four in FIG. 6) of received data signals, sampled in the plural flip-flops, not shown, of the sample circuit 5, two data signals, for example odd and even bit data, are output as output data signals of the clock and data recovery circuit.

The serial data signal output from the sample circuit 105 of the clock and data recovery circuit is written in a FIFO 115. More specifically, the serial data signal is written in a register 118 of the FIFO 115, with an output of the counter 117 as a write address. 2-bit data, read out from the register 118, with an output of the counter 116 as a read address, are supplied to a serial-to-parallel converter 109 via selector 108. The serial-to-parallel converter 109 executes serial-to-parallel conversion (2:10 serial-to-parallel conversion), based on an output of the counter 110, to output 10-bit parallel received data RXDAT [9:0] to an internal circuit, not shown. A divided clock signal obtained on dividing an output of a selector 107 by the counter 110 is supplied to serial-to-parallel converter 109 as a clock signal for the serial-to-parallel conversion. This counter may, for example, be a Johnson counter. The selector 107 selects either the divided clock signal of the divider 103 or output clock signal of the phase interpolator 104, based on a selection signal Sel1, and supplies the selected signal to the counter 110. In case wherein the output clock signal of the phase interpolator 104 is supplied to the counter 110, the selector 107 may be omitted. The selector 108 selects either received serial data from the sample circuit 105 of the clock and data recovery circuit, or received serial data, transiently stored in the FIFO 115, based on the selection signal Sel1, and outputs the selected data.

A serialization circuit includes a parallel-to-serial converter 114 for converting 10-bit parallel transmission data TXDAT [9:0] into two streams of serial data, a selector 119 and a multiplexer 113 receiving an output (even and odd bits) from the selector 119 to multiplex the data by 2:1. The serialization circuit also includes a pre-emphasis circuit 112 for enhancing the signal amplitude (pre-emphasis) at each signal change point, and a differential output buffer 111 for differentially outputting the transmission signal. The selector 119 selects either the transmission serial data, output from the parallel-to-serial converter 114, for example odd/even data of two bits, or received serial data from the selector 108, for example, odd/even data of two bits, based on a selection signal (interrupt enable signal) Sel2. For example, the selector 119 selects and outputs received serial data from the selector 108, during the pass-through time, while selecting and outputting an output of the parallel-to-serial converter 114 for the merge operation, that is, in case of the selection signal Sel2 indicating interrupt enable. It is noted that the merge operation means merging the frames of the received data and the transmission data and serially transmitting the so merged frames.

In the configuration of FIG. 6, the received serial data signal is written in and read from the FIFO 115 as serial data to perform change over of the clock from received clock (output of the phase interpolator 104) to an internal clock (clock obtained on dividing an output of the PLL circuit 102 by the divider 103). The received serial data read from the FIFO 115 is converted by the serial-to-parallel converter 109 into parallel data.

In contrast thereto, in the configuration shown in FIG. 7, serial data signals (2-bit data) output from the sample circuit 105 of the clock and data recovery circuit are supplied to the serial-to-parallel converter 109, for serial-to-parallel conversion, in order to generate received 10-bit parallel data RXDAT [9:0]. The 10-bit parallel data RXDAT [9:0] from the serial-to-parallel converter 109 are written in a register 118' of the FIFO 115 and parallel data read out from the register 118' are supplied to a selector 120. In this configuration, the selector 120 receives 10-bit transmission parallel data TXDAT [9:0] and 10-bit parallel data, read out from the register 118' of the FIFO 115 and, based on the selection signal (interrupt enable signal) Sel2, selects and outputs an output of the register 118 during the pass-through time, while selecting and outputting the transmission parallel data TXDAT [9:0] during interrupt enable time. A parallel output from the selector 120 is supplied to the parallel-to-serial converter 114 which performs 10:2 parallel-to-serial conversion. More specifically, the parallel-to-serial converter 114 converts the parallel 10 bits, made up of five even bits and five odd bits, into two streams of serial data of five even bits and five odd bits. The two streams of serial data from the parallel-to-serial converter 114 are supplied to the multiplexer 113 and thereby multiplexed into one stream of serial data which is supplied as an output. It is noted that, in the configuration shown in FIG. 7, the 10-bit parallel data, output from the serial-to-parallel converter 109, is written in the FIFO 115. Thus, the counter 117, generating a write address, is supplied with a signal, obtained on 10:1 frequency division of a clock signal, synchronized with received data, by a counter 110B, as a count clock. On the other hand, the counter 116, generating a read address, is supplied with a signal, obtained on 10:1 frequency division of a clock signal, synchronized with the received data, by a counter 110A, as a count clock.

Meanwhile, in Patent Document 2, there is disclosed, as a serial-to-parallel converter for transforming serial data into n-bit parallel data, a configuration including a FIFO having n-bit flip-flops and supplied with a serial data signal and a flip-flop for buffering an output of the FIFO, whereby the number of circuit elements in use may be reduced without detracting from the function.

[Patent Document 1]

Japanese Patent Kokai Publication No.JP-P2002-190724A

[Patent Document 2]

Japanese Patent Kokai Publication No. JP-P2005-33681A

SUMMARY OF THE DISCLOSURE

In the interface circuits, described with reference to FIGS. 6 and 7, the deserialization circuit includes a serial-to-parallel converter for converting received serial data into parallel data and the serialization circuit includes a parallel-to-serial converter for serial transmission of parallel data. There is also included a FIFO for temporally storing pass-through data. Hence, the interface circuit suffers from the problem that the chip area is increased while power consumption is also increased.

The interface circuits also suffer from the problem that, in case of making changeover between an output of the serial-to-parallel converter 114 (frame being supplied) and an output of the FIFO 115 (frame received) by the selector 119, difficulties are met in timing adjustment.

The invention disclosed in the present application may be summarized as follows:

A converter circuit in accordance with one aspect of the present invention includes: a register for receiving plural items of data serially and for sampling the received data to output plural items of the sampled data in parallel; a selector for receiving said plural items of data output in parallel from said register and for selecting one of said plural items of data in accordance with a control signal; and a circuit for generating said control signal to be supplied to said selector so that said plural items of data are serially output from said selector in the sequence corresponding to the sequence in which said plural items of data have been serially received by said register.

Preferably, in the present invention, a parallel output is obtained from the register, so that the function of serial-to-parallel conversion is achieved.

Preferably, in the present invention, the plural items of data from the selector are serially output in the sequence in which the plural items of data have been serially received by the register, so that the function as FIFO and the function of parallel-to-serial conversion may be achieved.

Preferably, in the present invention, there are provided a first counter for generating a control signal for said register to sample said plural items of data serially; and a second counter for generating said control signal for said selector. The first counter being operated by a first clock signal; and the second counter is operated by a second clock signal so that changeover is performed from clocking by said first clock signal to clocking by said second clock signal.

According to the present invention, second parallel data may supplied to the selector. When the selection signal has selected the second parallel data, the second parallel data is serially output.

According to the present invention, the selector includes a plurality of switches arranged in parallel for receiving relevant ones of a plurality of bit data forming the plural items of data. The output ends of the switches are connected in common. The switches receive relevant ones of multi-phase clock signals from the first counter, and are turned on to output bit data supplied thereto when the relevant ones of the clock signals are of a first value, while being turned off when the relevant ones of the clock signals are of a second value.

An interface circuit in accordance with another aspect of the present invention includes a pre-emphasis circuit receiving serial data output from the selector and enhancing the amplitude of the serial data by way of pre-emphasis to output the resulting data.

The interface circuit according to the present invention includes an input buffer to which are entered received data, and a clock and data recovery circuit for receiving the received data from the input buffer and an internal clock signal for recovering clocks and data. The second clock signal is supplied from the clock and data recovery circuit, while the first clock signal is the internal clock signal.

The meritorious effects of the present invention are summarized as follows.

According to the present invention, a serial-to-parallel converter, parallel-to-serial converter and FIFO are functionally incorporated in one to contribute to the reduction of circuit size and power consumption and to the increase of operation speed.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Reference will now be made to the accompanying drawings for further detailed description of the present invention. Initially, the configuration and the operating principle of the invention will be described.

Figure 1:
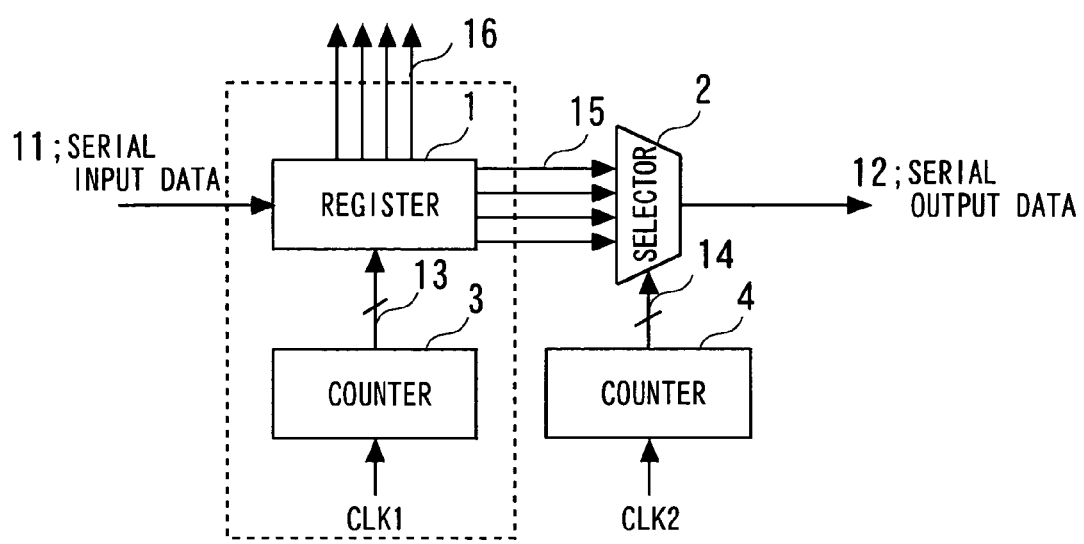
FIG. 1 is a schematic diagram showing the configuration of an embodiment of the present invention.

FIG. 1 shows the principle of the configuration of the present invention. It is noted that, in the following description, 1:4 conversion, that is, conversion of four bits of serial data into four bits of parallel data, will be described. The present invention is not limited to this configuration and may, of course, be applied to conversion of optional numbers of bits. A register 1, receives serial input data 11 and sequentially samples the serial input data 11, based on a control signal 13 from a counter 3, to output data as four bit data signals 15. The control signal 13 from the counter 3 is divided-by-four/four-phase clocks which are shifted from each other by one clock cycle of a clock signal CLK1. Four bit parallel data signals 16 are taken out in each cycle resulting from division by 4 of the clock signal CLK1 supplied to the counter 3.

The four bit data signals 15, output from the register 1, are supplied to the selector 2. The selector 2 selects data in time-division in order, in accordance with a control signal 14 from the counter 4, so as to be output as serial data 12. The control signal 14 from the counter 4 is made up of divided-by-four/four-phase clocks. With one clock cycle tCLK2 of the clock signal CLK2, the first to fourth phase clocks, forming the control signal 14, are phase-shifted from each other by tCLK2, with the high level period being tCLK2. Based on the first to four phase clocks of the control signal 14, supplied from the counter 4, the selector 2 selects and outputs corresponding one of the four data signals 15, during the time when the first to fourth phase clocks are at a HIGH level, as an example. In this manner, plural items of serial output data 12 are output in the sequence in which plural items of serial input data 11 have been supplied to the register 1, thus achieving the FIFO function. The change-over of clocking from the FIFO write clock CLK1 to the FIFO read clock CLK2 is performed by the FIFO. The above-described configuration may, of course, be applied to a LIFO (Last In First Output).

Figure 2:
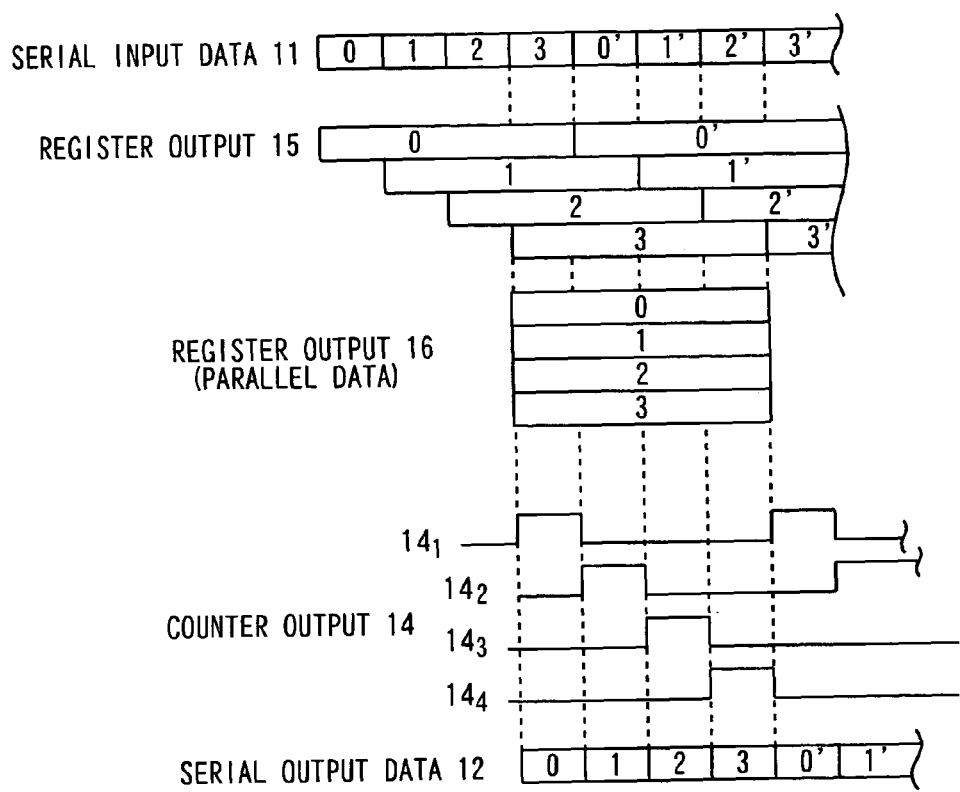
FIG. 2 is a timing chart for illustrating the operation of an embodiment of the present invention.

FIG. 2 is a timing diagram schematically showing the operating principle of an embodiment of the present invention. The serial input data 11 (0, 1, 2, 3) are sampled in this order by the register 1 and, from this register 1, the four bit data signals 15 are output. The four bit data signals 15 from the register 1 are supplied to the selector 2. The parallel output data 16 are obtained by latching the four bit data signals 15 from the register 1 with for example the fourth phase clock of the four phase clocks output from the counter 3. This fourth phase clock is the divided-by-4 clock which is HIGH when the serial input data 11 is "3". The selector 2 sequentially outputs serial output data 12 (0, 1, 2, 3) corresponding to the respective HIGH level periods of the control signals $14_1$ to $14_4$ from the counter 4. The control signals $14_1$ to $14_4$ from the counter 4 are divided-by-four/four-phase clocks.

Figure 3:
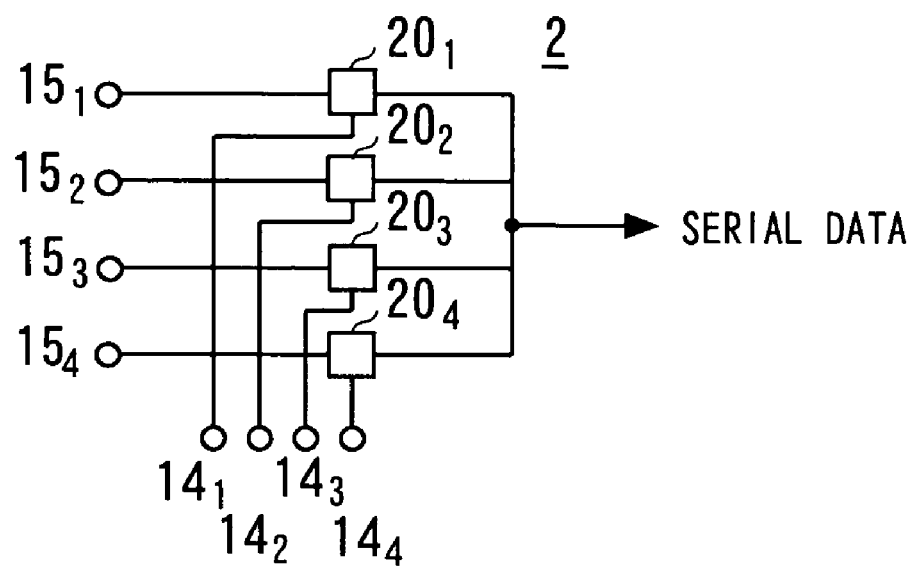
FIG. 3 is a schematic diagram showing the configuration of a first selector.

FIG. 3 is a diagram showing the configuration of the selector 2 of FIG. 1. The selector 2 includes four switches $20_1$ to $20_4$ receiving the four bit data signals 15 ($15_1$ to $15_4$) from the register 1. The four switches have outputs connected together and are adapted for being turned on or off by control signals 14 ($14_1$ to $14_4$) from the counter 4, respectively.

Figure 4A:
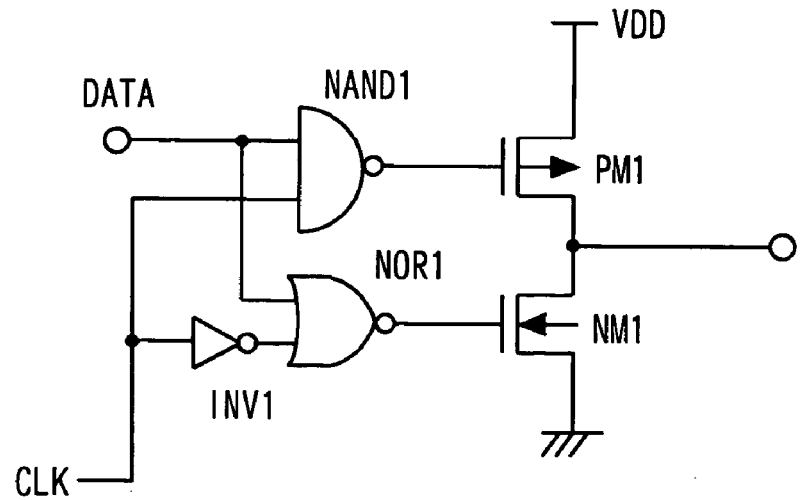
FIGS. 4A and 4B are schematic diagrams each showing a switch of FIG. 3.
Figure 4B:
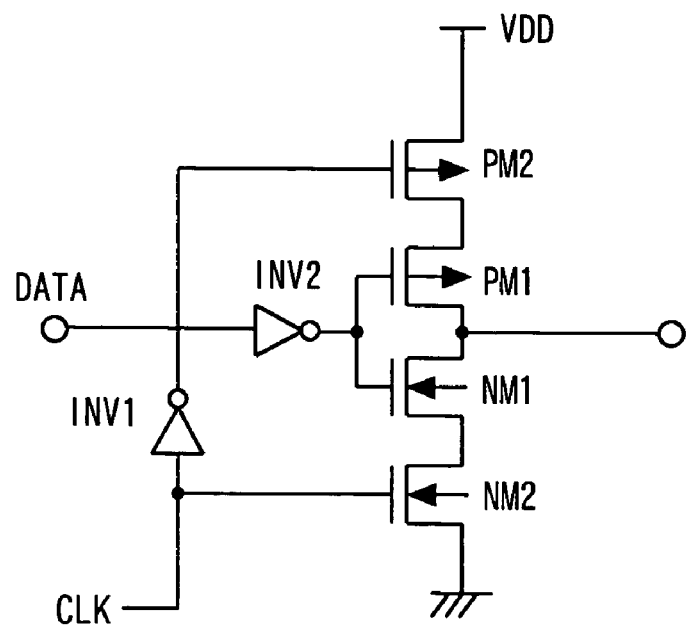

FIGS. 4A and 4B show two types of configurations of the switches $20_1$ to $20_4$ of FIG. 3. FIG. 4A shows a configuration including a PMOS transistor PM1 and an NMOS transistor NM1, connected in series between a power supply and GND. The configuration of FIG. 4A also includes a NAND circuit NAND1 and a NOR circuit NOR1. The NAND circuit NAND1 receives a data signal and a clock signal CLK, while the NOR circuit NOR1 receives the data signal and an inversion of the clock signal CLK (output of the inverter INV1). Outputs of the NAND1 and the NOR1 are connected to the gates of the PMOS transistor PM1 and the NMOS transistor NM1, respectively. If, in a case where the clock signal CLK is HIGH, the data is HIGH, the outputs of the NAND1 and the NOR1 become LOW, the PMOS transistor PM1 is turned on and the NMOS transistor NM1 is turned off, with the output becoming HIGH. If, in such case, the data is LOW, the outputs of the NAND1 and the NOR1 become HIGH, the PMOS transistor PM1 is turned off and the NMOS transistor NM1 is turned on, with the output becoming LOW. An alternative configuration shown in FIG. 4B is composed by a clocked inverter including an NMOS transistor NM2, a PMOS transistor PM2, a PMOS transistor PM1 and an NMOS transistor NM1, connected in series between a power supply and GND in the order of PM2, PM1, NM1 and NM2. The NMOS transistor NM2 and the PMOS transistor PM2 are controlled to be turned on and off by a clock signal CLK and by an inversion thereof, respectively. The gates of the PMOS transistor PM1 and the NMOS transistor NM1 are supplied in common with a signal corresponding to inversion of the data by an inverter INV2. Meanwhile, the switches $20_1$ to $20_4$ of FIG. 3 may be of a configuration different than the configuration shown in FIGS. 4A and 4B. For example, the switches $20_1$ to $20_4$ of FIG. 3 may also be composed by any types of three-state non-inverting buffers.

According to the present invention, the circuit may be reduced in size by incorporating a serial-to-parallel converter, a parallel-to-serial converter and a FIFO in one, thereby contributing to the reduction of power dissipation and to high operation speed. An example of the present invention, in which the present invention is applied to an interface circuit having a serialization/deserialization circuit (SerDes circuit), will now be described.

Figure 5:
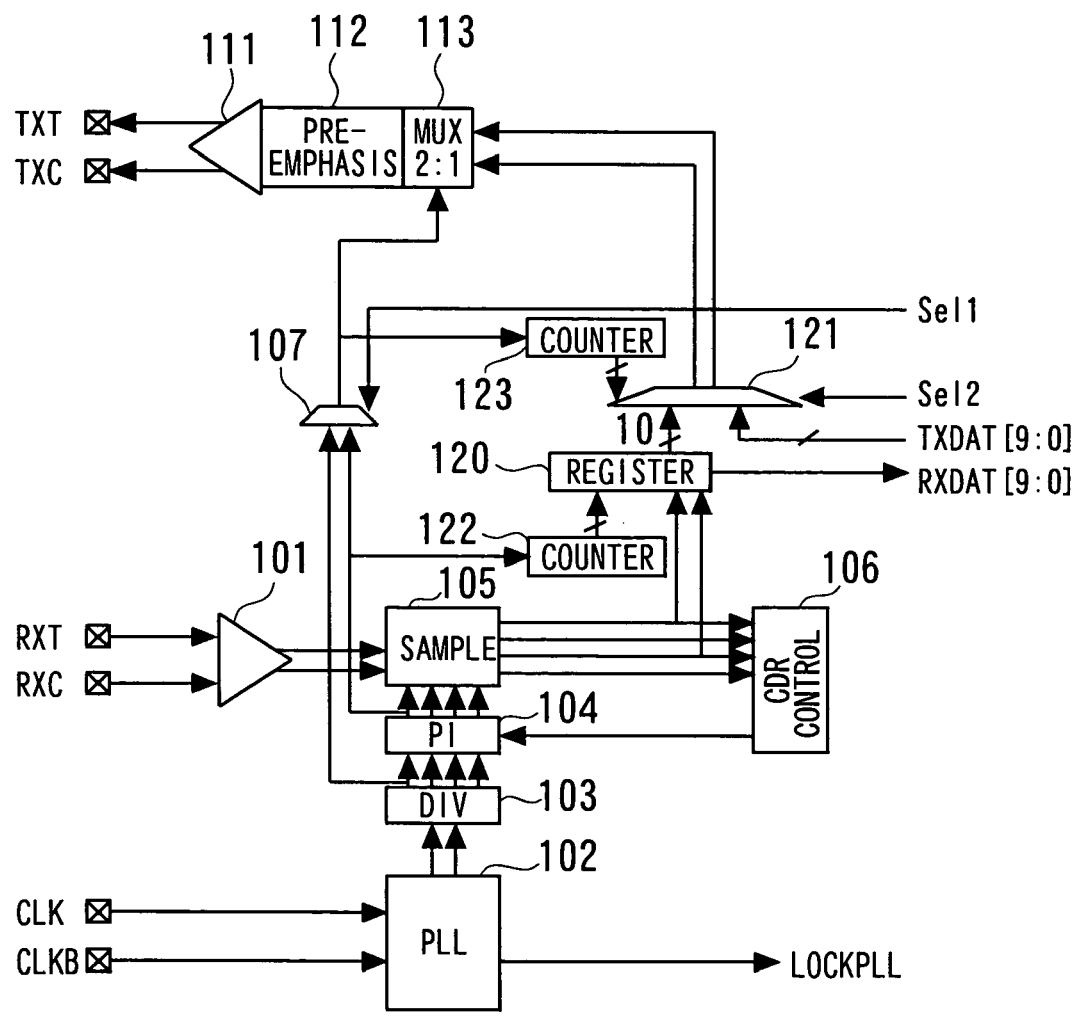
FIG. 5 is a diagram showing the configuration of an interface circuit according to an embodiment of the present invention.
Figure 6:
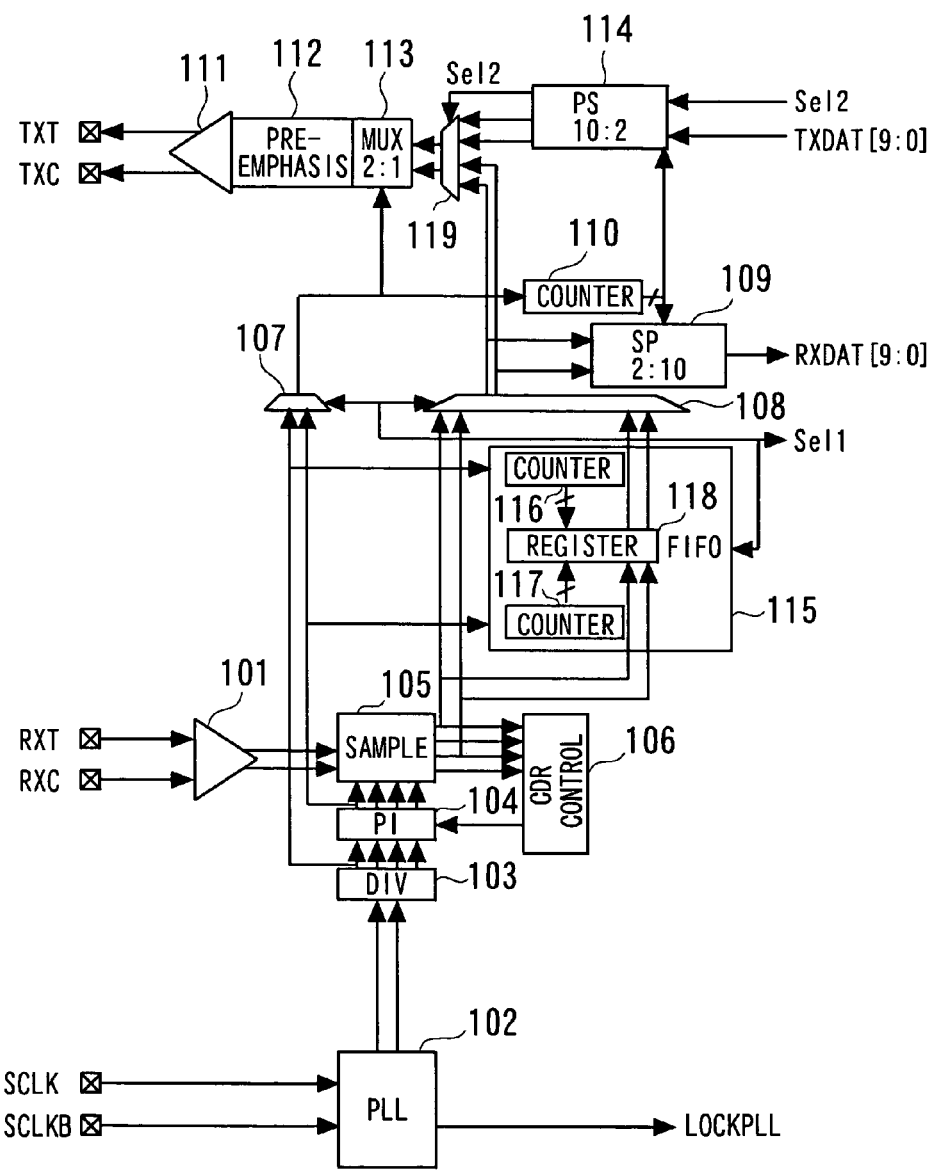
FIG. 6 is a diagram showing the configuration of a conventional interface circuit.
Figure 7:
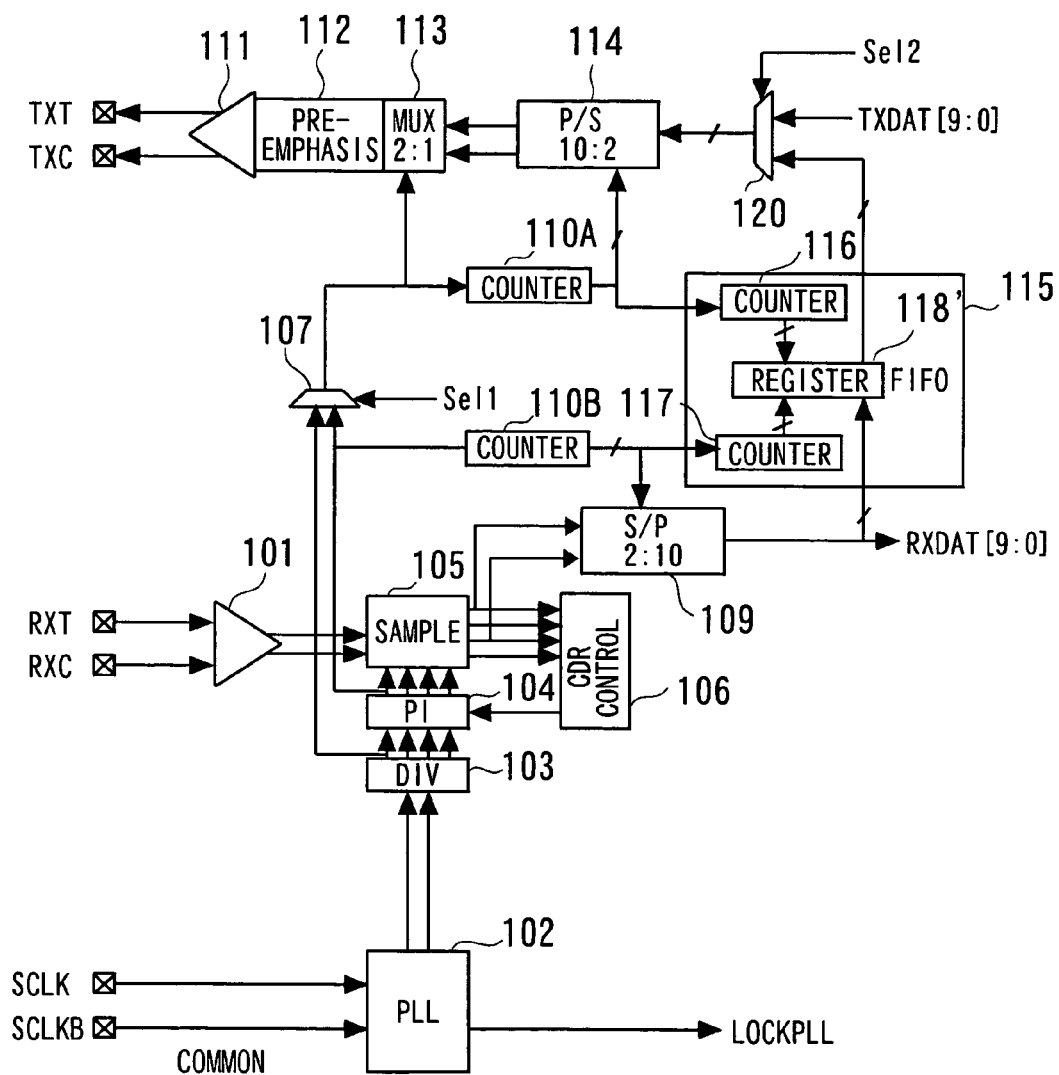
FIG. 7 is a diagram showing the configuration of another conventional interface circuit.

FIG. 5 is a diagram showing the configuration of an example of the present invention. In FIG. 5, a register 120, a selector 121, a counter 122 and a counter 123 correspond to the register 1, selector 2, counter 3 and to the counter 4 of FIG. 1, respectively. In FIG. 5, a PLL 102, a divider 103, a phase interpolator 104, a sample circuit 105, a CDR controller 106, an output buffer 111, a pre-emphasis circuit 112 and a multiplexer 113 are the same as corresponding components already explained with reference to FIGS. 6 and 7 and hence the corresponding description is dispensed with.

Two serial data signals from the sample circuit 105 of the clock and data recovery circuit is supplied to the register 120 and sampled by clock signals from the counter 122. Although no limitations are imposed on the clock signals from the counter 122, it may, for example, be five phase clocks of an even phase and five phase clocks of an odd phase of divided-by-10 ten phase clocks. The register 120 converts each of two serial data received from the sample circuit 105 into five-bit parallel data to output ten-bit parallel data RXDAT [9:0].

The ten-bit data from the register 120 are supplied to the selector 121 and selected during the pass-through time under control by the selection signal SEL2. The selector 121 selects the received ten-bit data, using outputs of the counter 123 as a selection signal to output two serial data. The outputs of the counter 123 may, for example, be five even phase clocks and five odd phase clocks of the divided-by 10 ten phase clocks. The serial data output may be odd bits and even bits. The two serial data from the selector 121 are supplied to the multiplexer 113. The multiplexer 113 multiplexes the two streams of serial data signals into one stream serial data which then is supplied to the pre-emphasis circuit 112.

Meanwhile, during the merge operation, that is, during the interrupt enable time, the selector 121 selects the ten-bit parallel transmission data TXDATA [9:0], under control by the selection signal SEL2. In this case, the selector 121 outputs two streams of serial data, using an output of the counter 123 as a selection signal. The outputs of the counter 123 may, for example, be five even phase clocks and five odd phase clocks of the divided-by-10 ten phase clocks. The two streams of serial data output from the selector 121 may be a stream of odd bits and a stream of even bits of the ten-bit parallel transmission data TXDAT [9:0]. That is, the selector 121 provides for 10:2 parallel-to-serial conversion on the transmission data TXDAT [9:0].

During the pass-through time, the selector 121 outputs the two streams of serial data in the sequence in which the two streams of serial data from the sample circuit 105 of the clock and data recovery circuit have been received by the register 120, thereby implementing the FIFO function, along with the register 120. Meanwhile, if the selector 107 selects, as a read clock of the FIFO (a clock supplied to the counter 123), an output of the divider 103, that is, a clock obtained on dividing the output clock of the PLL circuit 102, based on the selection signal Sel1, the change-over of the clock is performed. The interface circuit shown in FIG. 5 may be used advantageously to a high-speed serial interface circuit between modules, such as DIMMs (Dual Inline Memory Modules).

Although the present invention has so far been explained with reference to the preferred embodiments, the present invention is not limited to the particular configurations of these embodiments. It will be appreciated that the present invention may encompass various changes or corrections such as may readily be arrived at by those skilled in the art within the scope and the principle of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A converter circuit comprising:
 a register that receives plural items of data serially and that samples the received data so as to output plural items of the sampled data in parallel;
 a selector that receives said plural items of the sampled data output from said register and that selects one of said plural items of the sampled data in accordance with a control signal;
 a circuit that generates said control signal supplied to said selector so that said plural items of the sampled data are serially output from said selector in a particular sequence corresponding to a sequence in which said plural items of data have been serially received by said register;
 a first counter that generates a control signal for said register to sample said plural items of data serially; and
 a second counter that generates said control signal for said selector, wherein:
 said first counter is operated by a first clock signal; and
 said second counter is operated by a second clock signal different from said first clock signal;
 wherein a change-over of clocking from said first clock signal to said second clock signal to operate said second counter is performed.

2. The converter circuit according to claim 1, wherein the plural items of the sampled data output from the register are output as parallel data converted from said plural items of data serially received, wherein said register performs a serial-to-parallel conversion function.

3. The converter circuit according to claim 2, wherein the sequence in which said plural items of the sampled data are serially output from said selector is the same as the particular sequence in which said plural items of the sampled data have been serially received by said register, wherein said register performs a FIFO (First In First Out) function and a serial-to-parallel conversion function.

4. The converter circuit according to claim 1, wherein, in addition to said plural items of the sampled data output in parallel from said register, second parallel data are supplied to said selector; and wherein
 when said selector selects said second parallel data by a selection signal, said selector outputs serial data converted from said second parallel data.

5. The converter circuit according to claim 1, wherein said selector includes a plurality of switches; and each of said switches respectively receives a relevant one of a plurality of bit data forming said plural items of data;
 wherein said switches having output ends connected in common;
 wherein each of said switches respectively receives a relevant one of a plurality of multi-phase clock signals output from said first counter, wherein said multi-phase clock signals constitute said control signal;
 wherein said switches are each turned on to output bit data supplied thereto when the respective relevant one of the multi-phase clock signals is of a first value;
 wherein said switches are each turned off when the respective relevant one of the multi-phase clock signals is of a second value.

6. An interface circuit comprising:
 the converter circuit as set fourth in claim 1;
 an input buffer that receives input data; and
 a clock and data recovery circuit that receives data from said input buffer and an internal clock signal that recovers data and clock synchronized with the received data; wherein
 said second clock signal is supplied from said clock and data recovery circuit; and
 said first clock signal is said internal clock signal.

7. An interface circuit comprising:
 the converter circuit as set forth in claim 1;
 an input buffer that receives input data; and
 a clock and data recovery circuit that receives the data from said input buffer and an internal clock signal that recovers data and clock synchronized with the received data; wherein
 said second clock signal is a clock signal supplied from said clock and data recovery circuit or said internal clock signal; and
 said first clock signal is said internal clock signal.

8. An interface circuit comprising:
 the converter circuit as set fourth in claim 1; and
 a pre-emphasis circuit that receives serial data output from said selector of said converter circuit and that performs pre-emphasis of said received serial data so as to output the resulting serial data.

9. The interface circuit according to claim 8, wherein data output from the converter circuit is provided directly to said pre-emphasis circuit.

10. The converter circuit according to claim 1, wherein the plural items of data serially received by the register are not synchronized with either the first clock signal or the second clock signal.

11. The converter circuit according to claim 1, wherein the register includes a plurality of parallel output lines and a plurality of serial output lines, and wherein a set of data bits output at any given moment of time on the plurality of parallel output lines are also provided on the plurality of serial output lines as data bits respectively delayed by a plurality of clock periods.

12. The converter circuit according to claim 1, wherein the first and second clock signals have a same clock period but are out of phase with respect to each other.

* * * * *